US011053665B2

(12) United States Patent
Newlin et al.

(10) Patent No.: US 11,053,665 B2
(45) Date of Patent: Jul. 6, 2021

(54) SYSTEM AND METHOD FOR CONTROL OF A WORK VEHICLE (71) Applicant: CNH Industrial America LLC, New Holland, PA (US)

(72) Inventors: Timothy Aaron Newlin, Wichita, KS (US); Allan Paul Grossman, Wichita, KS (US); David R. Natzke, Wichita, KS (US); Paul Francis Szurpicki, Colwich, KS (US); Quinton James Berggren, Wichita, KS (US); Brady Dorr Lewis, Peck, KS (US); Neil A. Detra, Brooklyn, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/853,287

(22) Filed: Apr. 20, 2020

(65) Prior Publication Data
US 2020/0248435 A1 Aug. 6, 2020

Related U.S. Application Data (63) Continuation of application No. 15/388,761, filed on Dec. 22, 2016, now Pat. No. 10,633,826.

(51) Int. Cl.
E02F 9/22 (2006.01)
E02F 3/96 (2006.01)
(Continued)

(52) U.S. Cl.
CPC ............ E02F 9/2225 (2013.01); E02F 3/961 (2013.01); E02F 9/2004 (2013.01); E02F 9/22 (2013.01);
(Continued)

(58) Field of Classification Search
CPC ....... E02F 9/2225; E02F 9/2267; E02F 3/961; E02F 9/22; F15B 11/046; F15B 11/162
See application file for complete search history.

(56) References Cited

U.S. PATENT DOCUMENTS 3,120,314 A 2/1964 King
3,184,869 A 5/1965 Olsen
(Continued)

FOREIGN PATENT DOCUMENTS

CN 107119741 9/2017
DE 102006040459 3/2007
(Continued)

OTHER PUBLICATIONS

European Search Report for European Application No. 17209836.0, dated Apr. 24, 2018 (15 pages).
(Continued)

Primary Examiner — Abiy Teka
(74) Attorney, Agent, or Firm — Peter Zacharias; Patrick Sheldrake (57) ABSTRACT A dual mode control system for a work vehicle includes a hydraulic system configured to drive a loader assembly and a dozer assembly coupled to the work vehicle. The hydraulic system includes a fluid delivery system comprising a plurality of flow paths fluidly coupled to a hydraulic pump. The hydraulic system includes a valve assembly configured to regulate diversion of fluid into a first and a second hydraulic cylinders coupled to the fluid delivery system to adjust the loader assembly, or into a third cylinder coupled to the fluid delivery system to adjust the dozer assembly. The dual mode control system also includes a controller operably coupled to the valve assembly, and one or more user interfaces coupled to the controller to enable an operator to provide inputs to
(Continued)

cause the controller to adjust the valve assembly, and to thereby adjust the loader assembly or the dozer assembly.

20 Claims, 5 Drawing Sheets

(51) Int. Cl.
    *G05B 19/46*     (2006.01)
    *F15B 11/16*     (2006.01)
    *E02F 9/20*     (2006.01)
    *F15B 11/08*     (2006.01)
    *F15B 13/02*     (2006.01)
    *F15B 21/02*     (2006.01)
    *B62D 49/06*     (2006.01)

(52) U.S. Cl.
    CPC .......... *E02F 9/2235* (2013.01); *E02F 9/2267* (2013.01); *E02F 9/2271* (2013.01); *F15B 11/08* (2013.01); *F15B 11/162* (2013.01); *F15B 13/022* (2013.01); *F15B 21/02* (2013.01); *G05B 19/46* (2013.01); *B62D 49/06* (2013.01); *E02F 3/96* (2013.01); *F15B 2211/30595* (2013.01); *F15B 2211/31541* (2013.01); *F15B 2211/4053* (2013.01); *F15B 2211/41545* (2013.01); *F15B 2211/611* (2013.01); *F15B 2211/6303* (2013.01); *F15B 2211/6346* (2013.01); *F15B 2211/665* (2013.01); *F15B 2211/7142* (2013.01); *G05B 2219/41273* (2013.01); *G05B 2219/45017* (2013.01)

(56) References Cited

U.S. PATENT DOCUMENTS

| | | |
|---|---|---|
| 3,591,935 A | 7/1971 | Bremmer et al. |
| 4,076,080 A | 2/1978 | Anderson |
| 4,201,268 A | 5/1980 | Frisbee |
| 6,293,033 B1 | 9/2001 | Moriya et al. |
| 6,354,023 B1 | 3/2002 | Trahan et al. |
| 6,542,789 B2 | 4/2003 | Ufheil |
| 6,751,896 B2 | 6/2004 | Underwood |
| 8,424,299 B2 | 4/2013 | Kakizawa et al. |
| 8,700,271 B2 | 4/2014 | Evenson et al. |
| 9,222,236 B2 | 12/2015 | Ishibashi et al. |
| 9,347,467 B2 | 5/2016 | Song |
| 9,435,105 B2 | 9/2016 | Fleischmann et al. |
| 9,605,413 B2 | 3/2017 | Ge et al. |
| 2006/0112685 A1 | 6/2006 | Devier et al. |
| 2012/0073643 A1 | 3/2012 | Kure |
| 2012/0073843 A1* | 3/2012 | Kure ................... E02F 9/2257 172/407 |
| 2012/0267128 A1 | 10/2012 | Shintani et al. |
| 2013/0074378 A1 | 3/2013 | May |
| 2013/0282187 A1 | 10/2013 | Bang |
| 2014/0271073 A1 | 9/2014 | Mueller |
| 2014/0290102 A1 | 10/2014 | O'Donnell |

FOREIGN PATENT DOCUMENTS

| | | |
|---|---|---|
| EP | 2700754 | 2/2014 |
| GB | 2464988 | 5/2010 |
| JP | 2001165109 | 6/2001 |
| JP | 2012141037 | 7/2012 |
| WO | 2009023199 | 2/2009 |
| WO | 2012059177 | 5/2012 |

OTHER PUBLICATIONS

European Search Report for European Application No. 17209836.0, dated Sep. 24, 2018 (16 pages).

U.S. Appl. No. 16/836,063, filed Apr. 16, 2019, David Robert Natzke.

* cited by examiner

SYSTEM AND METHOD FOR CONTROL OF A WORK VEHICLE

CROSS-REFERENCE TO RELATED APPLICATION

This application is a continuation of U.S. application Ser. No. 15/388,761, entitled "SYSTEM AND METHOD FOR CONTROL OF A WORK VEHICLE," filed Dec. 22, 2016, which is herein incorporated by reference in its entirety for all purposes.

BACKGROUND

This disclosure relates generally to work vehicles, and more specifically to a system and method of controlling the work vehicle having functions of a track loader and a bulldozer.

A work vehicle, such as a tractor or a skid steer, may incorporate different attachment assemblies (e.g., a loader assembly and a dozer assembly) to perform different functions. For example, a work vehicle may use or switch to the loader assembly to perform a wide variety of tasks, including construction, transportation of materials, excavation, landscaping, etc. The same work vehicle may use or switch to the dozer assembly to push around material, such as soil, sand, and rubble, among others. These attachments may be powered by their respective hydraulic circuit(s) and operation of the hydraulic circuit(s) for a loader assembly may be different from that for a dozer assembly. As such, the operator may need to work with complex and/or cumbersome maneuvers to operate different attachment assemblies or switch back and forth between different functions (e.g., the loader and dozer functions). It may be desirable to simplify the controls needed to operate different attachment assemblies, as well as reduce complexity of the hydraulic components needed to power the hydraulic cylinders.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, a dual mode control system for a work vehicle includes a hydraulic system configured to drive a first assembly and a second assembly coupled to the work vehicle. The hydraulic system includes a hydraulic pump, and a fluid delivery system comprising a plurality of flow paths fluidly coupled to the hydraulic pump. The hydraulic system includes a valve assembly coupled to the fluid delivery system and configured to regulate diversion of fluid into fewer than all of the plurality of flow paths and to regulate one or more flow parameters. The hydraulic system includes a first hydraulic cylinder and a second hydraulic cylinder coupled to the fluid delivery system and configured to drive a first material handling attachment of the first assembly. The hydraulic system also includes a third hydraulic cylinder coupled to the fluid delivery system and configured to drive a second material handling attachment of the second assembly. The dual mode control system also includes a controller operably coupled to the valve assembly, wherein the controller is configured to control the valve assembly to regulate the diversion of the fluid in response to a first type of instruction received by the controller and regulate the one or more flow parameters in response to a second type of instruction received by the controller.

In another embodiment, a dual mode control system for a work vehicle includes a hydraulic system configured to drive a loader assembly and a dozer assembly coupled to the work vehicle. The hydraulic system includes a hydraulic pump, and a fluid delivery system comprising a plurality of flow paths fluidly coupled to the hydraulic pump. The hydraulic system includes a valve assembly coupled to the fluid delivery system and configured to regulate diversion of the fluid into fewer than all of the plurality of flow paths and to regulate one or more flow parameters. The hydraulic system includes a first hydraulic cylinder and a second hydraulic cylinder coupled to the fluid delivery system and configured to adjust a loader bucket of the loader assembly. The hydraulic system also includes a third hydraulic cylinder coupled to the fluid delivery system and configured to adjust a loader blade of the dozer assembly. The dual mode control system also includes a controller operably coupled to the valve assembly, and one or more user interfaces coupled to the controller to enable an operator to provide inputs to cause the controller to adjust the valve assembly, and to thereby adjust the loader bucket or the dozer blade.

In another embodiment, a method for operating a work vehicle having a dual control system includes determining an operating function of the work vehicle based on a first instruction, wherein the operating function comprises a loader function or a dozer function. The method includes updating operation of a hydraulic system based on the determined operating function of the work vehicle. The method includes determining an operation based on a second instruction, wherein the operation comprises tilting a loader bucket of a loader assembly coupled to the work vehicle or tipping a dozer blade of a dozer assembly coupled to the work vehicle. The method also includes operating the hydraulic system based on the second instruction to drive the loader assembly when the loader function is determined and to drive the dozer assembly when the dozer function is determined.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

While dual functions of a work vehicle may be enabled by different attachment assemblies (e.g., loader assembly, dozer assembly), an operator may need to work with complex and/or cumbersome maneuvers to operate or switch back and forth between different functions. Therefore, it may be desirable to simplify the controls needed to operate different functions, as well as reduce complexity of the hydraulic components needed to power the hydraulic cylinders. The presently disclosed embodiments include systems and methods for controlling a single hydraulic system that can be switched between powering components for different functions (e.g., loader and dozer functions). In particular, the operator may use the same control (e.g., same joystick(s) or lever(s), same maneuvers) to operate a hydraulic circuit to maneuver a work vehicle for both loader and dozer functions.

Figure 1:
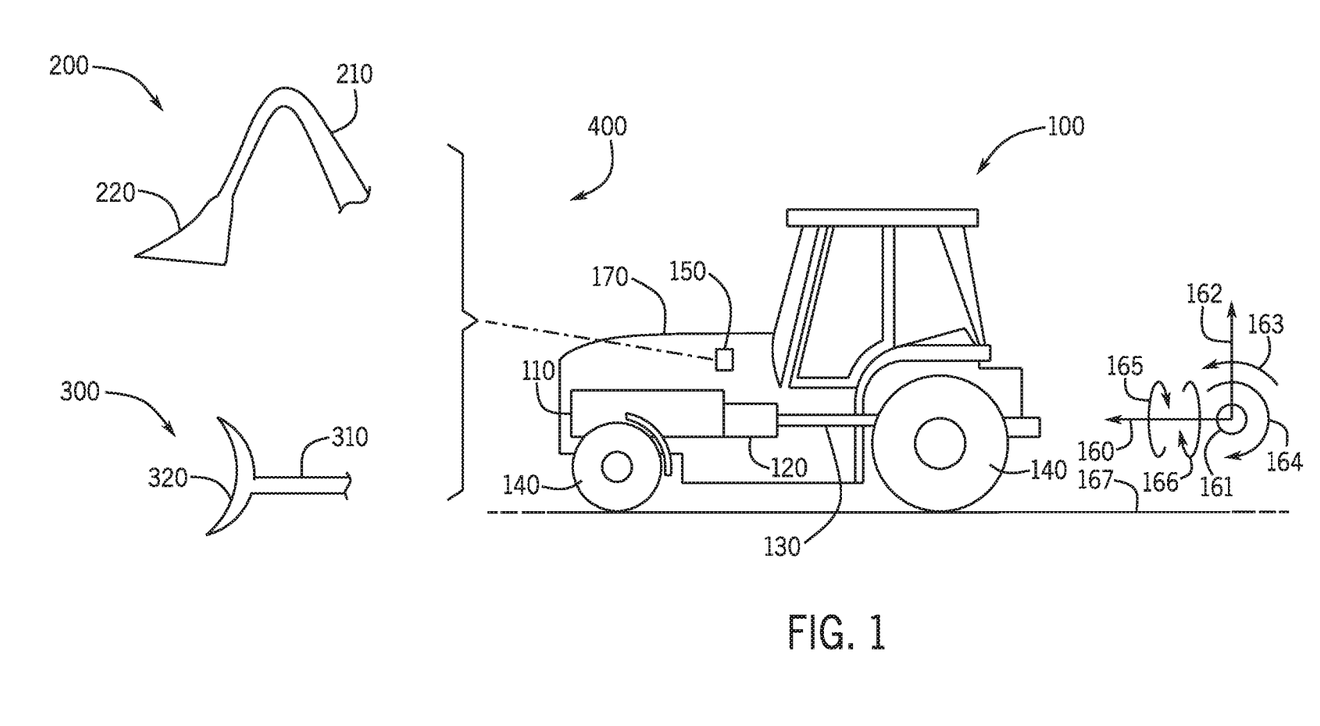
FIG. 1 is a schematic of a work vehicle, in accordance with an embodiment.

FIG. 1 is a diagram of a work vehicle 100 (e.g., a tractor), including an engine 110, an engine transmission assembly 120, a drive shaft 130, and wheels 140. The engine transmission assembly 120 is coupled to the engine 110 to transfer power from the engine 110 to the drive shaft 130, which powers the wheels 140 of the work vehicle 100. Further, the work vehicle 100 may include multiple assemblies, such as a loader assembly 200 and/or a dozer assembly 300, which are operable through a hydraulic control system 400, among other control systems (e.g., hydraulic and/or electrical control systems). The work vehicle 100 may include one or more sensors 150 (e.g., mechanical switch sensors) communicatively coupled to the hydraulic control system 400 and configured to detect coupling or attachment of the loader assembly 200 and/or the dozer assembly 300. As shown, the loader assembly 200 and the dozer assembly 300 may be described with reference to a forward axis 160, a transverse axis 161, a vertical axis 162, a first rotational direction 163 and a second rotational direction 164 with respect to the transverse axis 161, and a third rotational direction 165 and a fourth rotational direction 166 with respect to the forward axis 160.

In the illustrated embodiment, the loader assembly 200 includes one or more arms 210 that are pivotally coupled to a frame 170 of the work vehicle 100 and rotatable with respect thereto by one or more hydraulic cylinders. For example, the one or more arms 210 may be raised or lowered with respect to a ground 167. The loader assembly 200 also includes, among other things, a material handling attachment such as a loader bucket 220 that is pivotally coupled to the one or more arms 210 and is rotatable with respect thereto by one or more hydraulic cylinders of the hydraulic control system 400. For example, the one or more hydraulic cylinders may drive the loader bucket 220 to tilt or rotate in the first rotational direction 163 or the second rotational direction 164.

In the illustrated embodiment, the dozer assembly 300 includes one or more arms 310 pivotally coupled to the frame 170 of the work vehicle 100 and rotatable with respect thereto by one or more hydraulic cylinders. For example, the one or more arms 310 may be raised or lowered with respect to the ground 167. The dozer assembly 300 also includes, among other things, a material handling attachment, such as a dozer blade 320 that is pivotally coupled to the one or more arms 310 and is rotatable with respect thereto by one or more hydraulic cylinders of the hydraulic control system 400. For example, the one or more hydraulic cylinders may drive the dozer blade 320 to tip or rotate in the third rotational direction 165 or the fourth rotational direction 166. In one embodiment, the loader assembly 200 may be permanently coupled to the work vehicle 100 (e.g., a skid-steer loader) and the dozer assembly 300 may be removably coupled to the work vehicle 100. In one embodiment, both of the loader assembly 200 and the dozer assembly 300 are removably coupled to the work vehicle 100. In one embodiment, the one or more arms 310 of the dozer assembly 300 and the one or more arms 210 of the loader assembly 200 may be the same arm(s) (e.g., the loader bucket 220 and the dozer blade 320 are removably coupled to the one or more arms).

Figure 2:
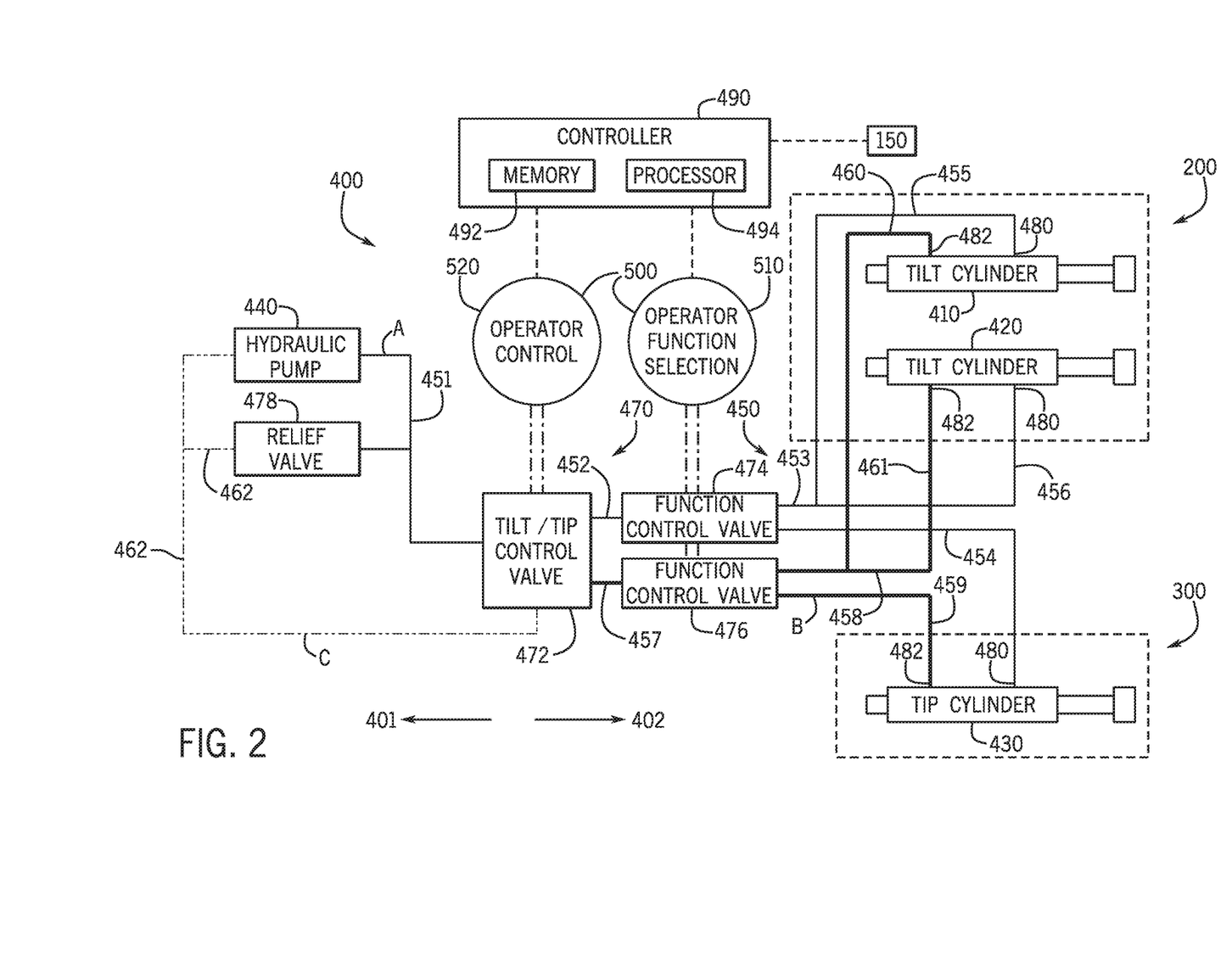
FIG. 2 is a schematic of a hydraulic control system of the work vehicle shown in FIG. 1, in accordance with an embodiment.

FIG. 2 is a schematic of one embodiment of the hydraulic control system 400 that may be used in the work vehicle 100 shown in FIG. 1. In the illustrated embodiment, the hydraulic control system 400 includes a first hydraulic cylinder 410 (e.g., tilt cylinder) and a second hydraulic cylinder 420 (e.g., tilt cylinder) configured to drive the loader bucket 220 of the loader assembly 200 (e.g., to tilt, such as in the first rotational direction 163 or the second rotational direction 164). The hydraulic control system 400 includes a third hydraulic cylinder 430 (e.g., tip cylinder) configured to drive the dozer blade 320 of the dozer assembly 300 (e.g., to tip, such as in the third rotational direction 165 or the fourth rotational direction 166). The hydraulic control system 400 includes at least one hydraulic pump 440 configured to deliver a fluid through a fluid delivery system 450 (e.g., a plurality of flow paths or conduits) to the first, second, and third hydraulic cylinders 410, 420, and 430. The hydraulic control system 400 also includes a controller 490 (e.g., electronic controller) and a valve assembly 470 that includes a multiple valves coupled to the fluid delivery system 450 and configured to adjust or regulate flow parameters (e.g., on/off, flow pressure, flow volume, flow rate, flow direction) to the first, second, and third hydraulic cylinders 410, 420, and 430. The controller 490 may receive instructions to control the valve assembly 470, and thereby control the first, second, and third hydraulic cylinders 410, 420, and 430 to operate the loader bucket 220 and/or the dozer blade 320.

As shown, the valve assembly 470 includes a first control valve 472, a second control valve 474, a third control valve 476, and a relief valve 478. It may be appreciated that a control valve may refer to any suitable type of control valve (e.g., spool valve) to adjust or regulate flow parameters (e.g., on/off position of the valve, flow pressure, flow volume, flow rate, flow direction), and a relief valve may refer to any suitable type of relief valve that adjust or regulate the flow pressure and/or flow volume and allow a pressurized fluid to flow out of the system (e.g., the fluid delivery system 450)

as to relieve the pressure. For the purpose of discussion, components of the hydraulic control system 400 are referred as disposed upstream (as indicated by an arrow 401) and downstream (as indicated by an arrow 402) with respect to the hydraulic pump 440. Different sections of the fluid delivery system 450 are labeled as line A, line B, and line C. Upstream of the first control valve 472, the line A couples the hydraulic pump 440 to the relief valve 478, and the line C couples the hydraulic pump 440, the line A, and the line B to the relief valve 478, such that the pressurized fluid may be released from the relief valve 478 in certain embodiments (e.g., neither of the loader assembly 200 and the dozer assembly 300 is in operation, over-pressurized fluid). Downstream of the first control valve 472, the fluid delivery system 450 splits into the line A and the line B. The line A delivers the fluid to first axial ends 480 of the first, second, and third hydraulic cylinders 410, 420, and 430. The line B delivers the fluid to second axial ends 482 of the first, second, and third hydraulic cylinders 410, 420, and 430.

The first control valve 472 and the second control valve 474 are disposed along the line A. The line A includes a flow path 451 between the hydraulic pump 440 and the first control valve 472, a flow path 452 between the first control valve 472 and the second control valve 474, flow paths 453 between the second control valve 474 and the first and second hydraulic cylinders 410 and 420 (e.g., for the loader assembly 200), and a flow path 454 between the second control valve 474 and the third hydraulic cylinder 430 (e.g., for the dozer assembly 300). The flow paths 453 may include a flow path 455 coupled to the first axial end 480 of the first hydraulic cylinder 410 and a flow path 456 coupled to the first axial end 480 of the second hydraulic cylinder 420.

The first control valve 472 and the third control valve 476 are disposed along the line B. The line B includes a flow path 457 between the first control valve 472 and the third control valve 476, flow paths 458 between the third control valve 476 and the first and second hydraulic cylinders 410 and 420 (e.g., for the loader assembly 200), and a flow path 459 between the third control valve 476 and the third hydraulic cylinder 430 (e.g., for the dozer assembly 300). The flow paths 458 may include a flow path 460 coupled to the second axial end 482 of the first hydraulic cylinder 410 and a flow path 461 coupled to the second axial end 482 of the second hydraulic cylinder 420. The relief valve 478 is disposed along the line C. The line C includes flow paths 462 coupling the hydraulic pump 440 to the relief valve 478 and coupling the line A and the line B (e.g., at the first control valve 472) to the relief valve 478.

It should be noted that components of the hydraulic control system 400 are set up as described above such that the fluid (e.g., from one hydraulic pump 440) splits or diverts at the second and third control valves 474 and 476 (e.g., function control valves) based on the work vehicle 100 function selected. In particular, when the loader function or mode of the work vehicle 100 is selected, the valves 474 and 476 are controlled to a first position in which the fluid diverts to the first and second hydraulic cylinders 410 and 420 (e.g., tilt cylinders). In contrast, when the dozer function or mode of the work vehicle 100 is selected, the valves 474 and 476 are controlled to a second position in which the fluid diverts to the third cylinder 430 (e.g., tip cylinder). The valve 472 (e.g., tilt/tip control valve) may then be used to control both the tilt function of the loader assembly 200 and the tip function of the dozer assembly 300, thereby simplifying the controls or maneuvers used to operate different functions.

The controller 490 may receive instructions to control the valve assembly 470 and thereby control the first and second hydraulic cylinders 410 and 420 (e.g., for the loader assembly 200) and control the third hydraulic cylinder 430 (e.g., for the dozer assembly 300). In the illustrated embodiment, the controller 490 includes a memory 492 (e.g., a non-transitory computer-readable medium/memory circuitry) storing one or more sets of instructions (e.g., processor-executable instructions) that may be implemented to operate the valve assembly 470. The controller 490 also includes one or more processors 494 configured to access and execute the one or more sets of instructions encoded on the memory 492 (e.g., to control the valve assembly 470). For example, the memory 492 may include volatile memory, such as random access memory (RAM), and/or non-volatile memory, such as read-only memory (ROM), optical drives, hard disc drives, or solid-state drives. Additionally, the one or more processors 494 may include one or more application specific integrated circuits (ASICs), one or more field programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, application specific integrated circuits, and other programmable circuits.

The controller 490 may be communicatively coupled to one or more user interfaces 500. The one or more user interfaces 500 may include graphical user interface(s), touch screen(s), push button(s), control panel(s), joystick(s), lever(s), or any other types of interfaces provided in the work vehicle 100 to allow a user or an operator to communicate instructions, inputs, or signals corresponding to commands to the controller 490 to control the valve assembly 470. It may be appreciated that the one or more user interfaces 500 may be dedicated interface(s) for the hydraulic control system 400 or may be general interface(s) for the work vehicle 100. For example, the one or more user interfaces 500 may be configured to input instructions/commands to control the operation of the hydraulic control system 400 and/or the operations of various other components and systems of the work vehicle 100. Further, the controller 490 may be communicatively coupled to the one or more sensors 150 (e.g., mechanical switch sensors) that are configured to detect the attachment or coupling of the loader assembly 200 and/or the attachment of the dozer assembly 300. For example, the controller 490 may determine that the loader assembly 200 and/or the dozer assembly 300 is attached based on signals generated by and received from the one or more sensors 150.

In one embodiment, the one or more user interfaces 500 include a first user interface 510 (e.g., a push button, a panel, a touch screen) configured to provide signals/instructions relating to a selected function (e.g., loader function, dozer function) of the work vehicle 100, and include a second user interface 520 (e.g., joystick(s), handgrip(s), lever(s)) configured to provide signals/instructions relating to operation of the loader bucket 220 and/or the dozer blade 320. Accordingly, in some embodiments, the first user interface 510 is configured to provide signals/instructions relating to operation of the second and third control valves 474 and 476 (e.g., to control the valves 474 and 476), and the second user interface 520 is configure to provide signals/instructions relating to operation of the first control valve 472 (e.g., to control the valve 472).

In operation, the controller 490 may instruct the valve assembly 470 to change parameters (e.g., open/close positions, flow pressure, flow volume, flow rate, flow direction) of respective control valves to drive respective hydraulic cylinder(s) to move (e.g., tilt) the loader bucket 220 or move (e.g., tip) the dozer blade 320. For example, upon receiving inputs from the one or more user interfaces 500 (e.g., operator inputs) and/or the one or more sensors 150, the controller 490 may adjust parameters of the first, second, and third control valves 472, 474, and 476 accordingly so that the fluid flows from the hydraulic pump 440 through flow paths 451, 452, and 453 and/or flow paths 451, 457, and 458 to drive the first hydraulic cylinder 410 and/or the second hydraulic cylinder 420 to adjust the loader bucket 220. In one embodiment, the first hydraulic cylinder 410 is configured to tilt the loader bucket 220 in either the first rotational direction 163 or the second rotational direction 164. The fluid flow pressure, volume, and/or rate through the flow path 455 into the first axial end 480 may be greater than the fluid flow pressure, volume, and/or rate through the flow path 460 into the second axial end 482 to drive the first hydraulic cylinder 410 to tilt the loader bucket 220 in the first rotational direction 163, and vice versa.

For example, upon receiving inputs from the one or more interfaces 500 and/or the one or more sensors 150, the controller 490 may adjust parameters of the first, second, and third control valves 472, 474, and 476 accordingly so that the fluid flows from the hydraulic pump 440 through flow paths 451, 452, and 454 and/or flow paths 451, 457, and 459 to drive the third hydraulic cylinder 430 to adjust the dozer blade 320. In one embodiment, the third hydraulic cylinder 430 is configured to tip the dozer blade 320 in either the third rotational direction 165 or the fourth rotational direction 166. The fluid flow pressure, volume, and/or rate through the flow path 454 into the first axial end 480 may be greater than the fluid flow pressure, volume, and/or rate through the flow path 459 into the second axial end 482 to drive the third hydraulic cylinder 430 to tip the dozer blade 320 in the third rotational direction 165, and vice versa.

Thus, in operation, an operator input at the first user interface 510 (e.g., to select a loader function or a dozer function) or a signal from the sensor 150 indicative of the type of attachment and/or indicative of the presence or absence of a certain attachment (e.g., dozer blade 230) may cause the controller 490 to control the valves 474 and 476. For example, selection of the dozer function may cause the controller 490 to control the valves 474 and 476 to one position in which the valves 474 and 476 enable fluid flow toward the third cylinder 430 and blocks fluid flow toward the first and second cylinders 410 and 420. In some embodiments, selection of the loader function may cause the controller 490 to control the valves 474 and 476 to another position in which the valves 474 and 476 enable fluid flow toward the first and second cylinders 410 and 420 and block fluid flow toward the third cylinder 430. Subsequently, the valve 472 may be controlled (e.g., via an operator interaction or input at the second operator interface 520) to adjust fluid flow from the pump 440 to the lines 452, 457 to thereby adjust the loader bucket 220 or the dozer blade 320 (e.g., depending on the position of the valves 474 and 476).

Figure 3:
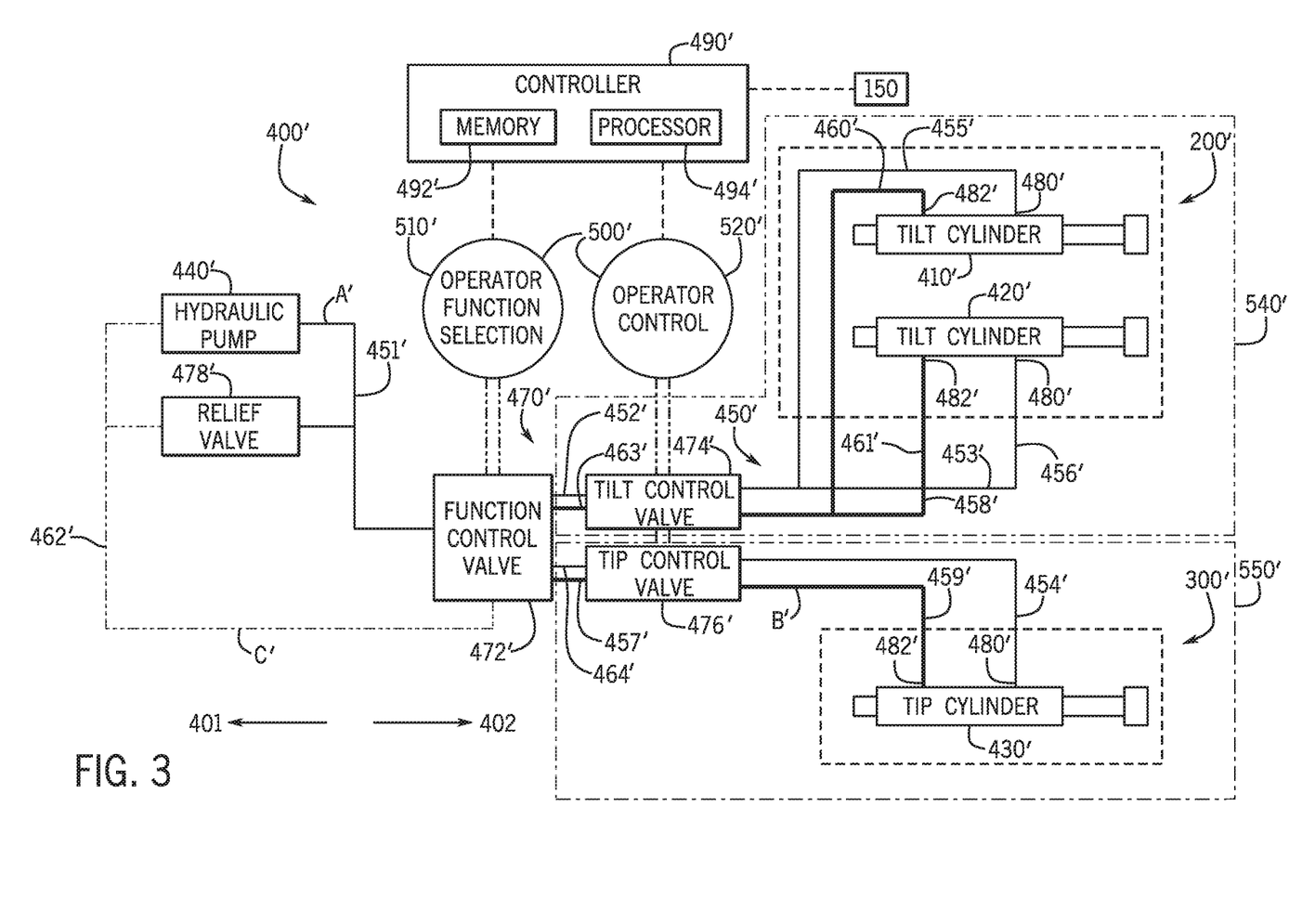
FIG. 3 is a schematic of another example of a hydraulic control system of the work vehicle shown in FIG. 2.

FIG. 3 is a schematic of a hydraulic control system 400' in accordance with an embodiment. As illustrated, the schematic of the hydraulic control system 400' in FIG. 3 may differ from that shown in FIG. 2 in that downstream of the first control valve 472', the fluid delivery system 450' splits into a first hydraulic system 540' and a second hydraulic system 550'. The first and the second hydraulic systems 540' and 550' each includes the line A' and the line B', wherein the line A' of the first hydraulic system 540' includes a flow path 463' coupling the first control valve 472' to the second control valve 474', and the line B' of the second hydraulic system 550' includes a flow path 464' coupling the first control valve 472' to the third control valve 476'. For the first hydraulic system 540', the flow paths 458' couple the first and second hydraulic cylinders 410' and 420' (e.g., for the loader assembly 200') to the second control valve 474'. For the second hydraulic system 550', the flow path 454' couples the third hydraulic cylinder 430' (e.g., for the dozer assembly 300') to the third control valve 476'.

Upon receiving inputs provided by the one or more interfaces 500' and/or the one or more sensors 150, the controller 490' may control the first control valve 472' so that the fluid flows from the hydraulic pump 440' to the first hydraulic system 540' to drive the first and second hydraulic cylinders 410' and 420' to move (e.g., tilt) the loader bucket 220, or the controller 490' may control the first control valve 472' so that the fluid flows from the hydraulic pump 440' to the second hydraulic system 550' to drive the third cylinder 430' to move (e.g., tip) the dozer blade 320 in the manners set forth above. Accordingly, in this embodiment, the first user interface 510' is configured to provide signals/instructions relating to operation of the first control valve 472' (e.g., to control the valve 472'), and the second user interface 520' is configured to provide signals/instructions relating to operation of the second and third control valves 474' and 476' (e.g., to control the valves 474' and 476').

Thus, in operation, an operator input at the first user interface 510' (e.g., to select a loader function or a dozer function) or a signal from the sensor 150 may cause the controller 490' to control the valve 472'. For example, selection of the dozer function may cause the controller 490' to control the valve 472' to one position in which the valve 472' enables fluid flow toward the third cylinder 430' and blocks fluid flow toward the cylinders 410' and 420'. In some embodiments, selection of the loader function may cause the controller 490' to control the valve 472' to another position in which the valve 472' enables fluid flow toward the cylinders 410' and 420' and blocks fluid flow toward the third cylinder 430'. Subsequently, the valves 474' and 476' may be controlled (e.g., via the second operator interface 520') to adjust fluid flow to lines 453', 458', 454', and 459' to thereby adjust the loader bucket 220 or the dozer blade 320.

Figure 4:
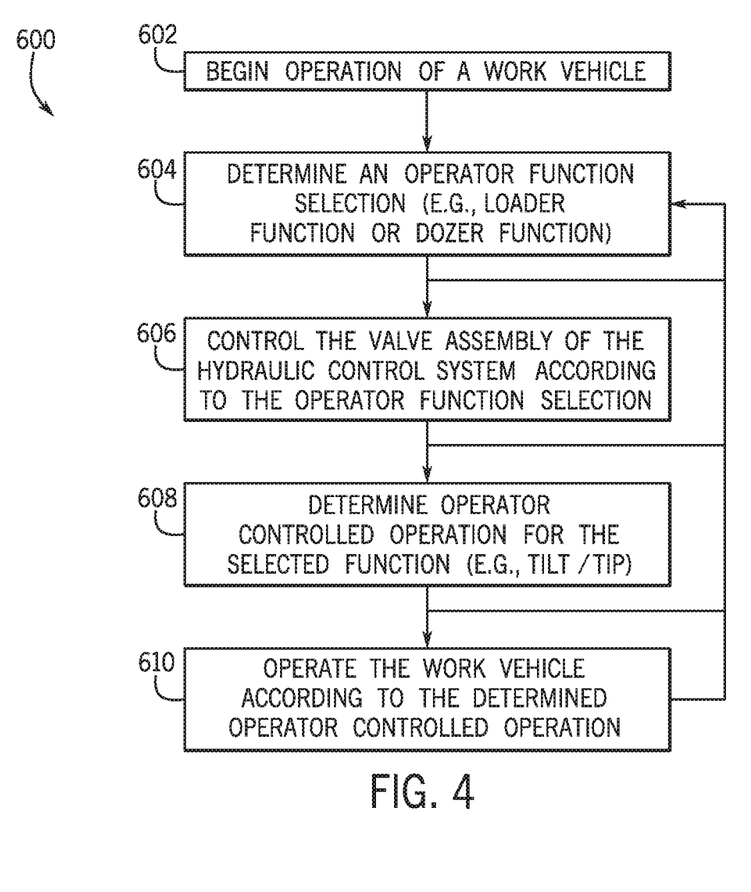
FIG. 4 is a flow chart illustrating a method for operating a work vehicle having the hydraulic control system shown in FIG. 2 or FIG. 3, in accordance with an embodiment.

FIG. 4 is a flow chart illustrating a method 600 for operating the work vehicle 100 having the hydraulic control systems 400 and 400' shown in FIG. 2 or FIG. 3, respectively. One or more of the steps of the method 600 may be executed by the controller 490 (490'). Certain steps of the method may be omitted, and other steps may be added. The method 600 includes beginning operation of the work vehicle 100 (step 602) and determining an operator function selection (e.g., loader function or dozer function) (step 604). Upon beginning operation of the work vehicle 100, signal(s) or input(s) corresponding to the operation function selection may be fed to the controller 490 (490'), enabling determination of whether the loader function or the dozer function is selected (step 602). In one embodiment, the one or more user interfaces 500 (500') may be used or activated (e.g., by the operator) to select the operation function, and signals/inputs corresponding to such selection are fed to the controller 490 (490'). For example, the user may use the first user interface 510 (510') (e.g., a push button, a panel, a touch screen) or the second user interface 520 (520') (e.g., joystick(s), handgrip(s), lever(s)) communicatively coupled to the controller 490 (490') to select a loader function or a dozer function. In certain embodiment, coupling or attachment of the dozer assembly 300 (300') may be detected by the one or more sensors 150 (e.g., mechanical switch sensors) and signal(s) corresponding to the detection may be automatically fed to the controller 490 (490'), such that the controller 490 (490') may determine that the dozer function or the loader function is selected.

The method 600 includes controlling the valve assembly 470 (470') of the hydraulic control system 400 (400') according to the operator function selection (e.g., loader function or dozer function) (step 606). Once the operator function selection is made, parameters of the valve assembly 470 (470') are controlled to reflect on the selection and prepare the hydraulic control system 400 (400') for the selected function. In one embodiment, the controller 490 may change parameters (e.g., open/close positions) of the second and third control valves 474 and 476 to divert the pressurized fluid to the first and second hydraulic cylinders 410 and 420 of the loader assembly 200 if the loader function is selected, or to divert the pressurized fluid to the third hydraulic cylinder 430 of the dozer assembly 300 if the dozer function is selected (e.g., see FIG. 2). In one embodiment, the controller 490' may control parameters (e.g., open/close positions) of the first control valve 472' to divert the pressurized fluid to the first hydraulic system 540' (e.g., including the first and second hydraulic cylinders 410' and 420') if the loader function is selected, or to divert the pressurized fluid to the second hydraulic system 550' (e.g., including the third hydraulic cylinder 430') if the dozer function is selected (e.g., see FIG. 3).

The method 600 includes determining operator controlled operation for the selected function (e.g., tilt/tip) (step 608). Once the valve assembly 470 (470') of the hydraulic control system 400 (400') is controlled for the selected function (e.g., loader function or dozer function), the controller 490 (490') further determines the specific operation to be performed. For example, the controller 490 (490') may determine flow parameters (e.g., on/off position of the valve, flow pressure, flow volume, flow rate, flow direction) for the respective control valves based on signal(s)/input(s) provided by the second user interface 520 (520') (e.g., joystick(s), handgrip(s), lever(s)). For example, the operator may maneuver the second user interface 520 (520') in different movements (e.g., left, right, forward, reverse) that cause the controller 490 (490') to control the valve assembly 479 (470') (e.g., valves 472' or valves 474' and 476') to adjust flow parameters into the respective hydraulic cylinders (e.g., the first and second hydraulic cylinders 410 (410') and 420 (420'), or the third hydraulic cylinder 430 (430')).

The method 600 includes operating the work vehicle 100 according to the determined operator controlled operation (step 610). Concurrent or substantially concurrent with determining the operator controlled operation, the controller 490 (490') also controls operation of the valve assembly 470 (470') to implement the determined flow parameters (e.g., on/off position of the valve, flow pressure, flow volume, flow rate, flow direction) for the respective valves to drive respective hydraulic cylinder(s) to move (e.g., tilt) the loader bucket 220 or move (e.g., tip) the dozer blade 320. It should be noted that at any points during the operation of the work vehicle 100 (e.g., steps 604 to 610), the operator function selection (e.g., loader function or dozer function) may be updated or re-selected and the operation of the hydraulic control system 400 (400') may be updated accordingly. For example, to switch from the loader assembly 200 to the dozer assembly 300, the hydraulic control system 400 (400') may proceed to the operation discussed in the step 604 and subsequent operations followed, such that the operator may use the same control (e.g., the second user interface 520 (520')) to maneuver the work vehicle 100 for both loader and dozer functions. In particular, when the loader function is selected, the operator may operate the second user interface 520 (520') (e.g., joystick(s), handgrip(s), lever(s)) in one movement to drive the first and second hydraulic cylinders 410 (410') and 420 (420') to move (e.g., tilt) the loader bucket 220 in a certain rotational direction. When the dozer function is selected, operating the second user interface 520 (520') in the same manner (e.g., same movement) enables the operator to move (e.g., tip) the dozer blade 320 in a certain rotational direction.

Figure 5:
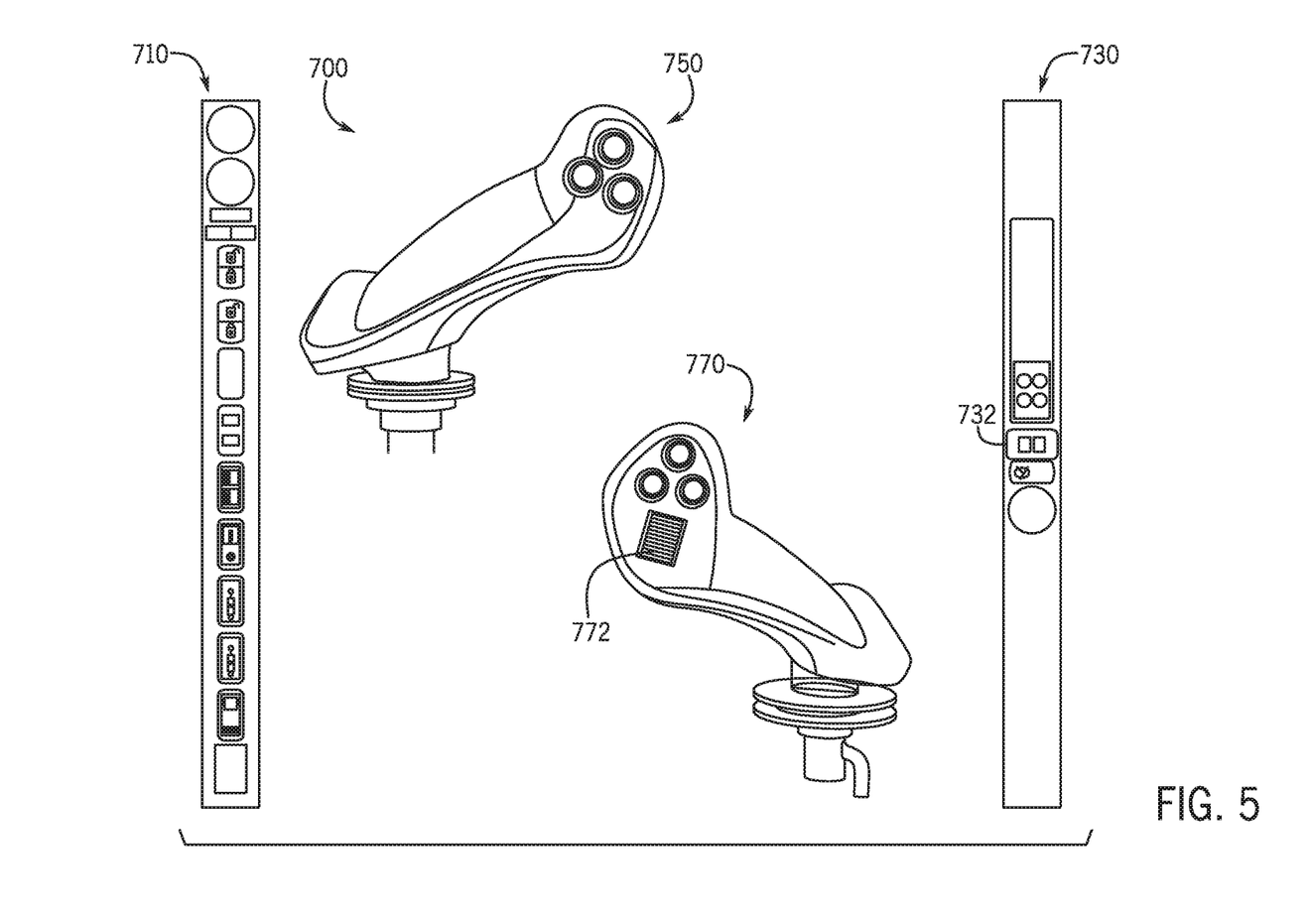
FIG. 5 is a schematic of an electronic control interface for operating the work vehicle shown in FIG. 1, in accordance with an embodiment.

In certain embodiments, the hydraulic control system 400 (400') may be controlled electronically. For example, the valve assembly 470 (470') may be electronically controlled. In addition, other functions of the work vehicle 100 may also be electronically controlled, as shown in FIG. 5. FIG. 5 is a schematic of an electronic control interface 700 for operating the work vehicle 100, in accordance with an embodiment. In the illustrated embodiment, the electronic control interface 700 includes a first console 710, a second console 730, a first control grip or left-hand grip 750, and a second control grip or right-hand grip 770. Although it should be understood that the consoles, grips, and inputs (e.g., buttons, switches, etc.) may be arranged and distributed in any of a variety of manners. It may be appreciated that the electronic control interface 700 may enable operation of the work vehicle 100 in a similar matter as set forth for the one or more interfaces 500 (500'). The electronic interface 700 may be communicatively coupled to the controller (490, 490'), such that the electronic control interface 700 may facilitate switching back and forth between loader and dozer functions. In particular, the same control grips (e.g., the first and second control grips 750 and 770) and the same switches on the consoles (e.g., the first and second consoles 710 and 730) may be used to control the work vehicle 100 in either function (e.g., loader function and dozer function).

As shown, the second console 730 may include a switch 732 (e.g., toggle switch) configured to enable the operator to switch between using the first and second control grips 750 and 770 in a similar manner (e.g., similar maneuvers) for a standard control for a loader (e.g., skid-steer) and for a standard control for a bulldozer. In certain embodiments, if the switch 732 is toggled to the loader function or mode, the work vehicle 100 may function like a loader. For example, the first control grip 750 may control the direction and speed of the work vehicle 100, and the second control grip 770 may control the loader arm (e.g., arms 210) and loader bucket movement (e.g., bucket 220). In certain embodiments, if the switch 732 is toggled to the dozer function or mode, the work vehicle 100 may function like a bulldozer. For example, the first control grip 750 may control the direction and speed of the work vehicle 100, and the second control grip 770 may control the dozer arm (e.g., arms 310) and the dozer blade movement (e.g., dozer blade 320). For example, a switch 772 (e.g., thumb wheel may be used to control rotation of the loaded bucket while the switch 732 is in one position and to control rotation of the dozer blade while the switch 732 is in another position. Herein, the arm movement may generally change the height of the loader bucket or of the dozer blade, and the loader bucket movement and dozer blade movement may refer to tilting or tipping in different rotational directions, as discussed above. It should be noted that each of the first console 710, the second console 730, the first control grip 750, and the second control grip 770 may include a plurality of switches and/or buttons, and the specific function of the switches and/or buttons may correlate with the function or mode (e.g., loader function, dozer function) selected with the switch 732.

While the disclosed embodiments relate to the work vehicle 100 having the loader bucket 220 and the dozer blade 320, it should be understood that any suitable type of attachment may additionally or alternatively be utilized on the work vehicle 100 and controlled via the hydraulic control system 400 (400'). For example, the other attachments may be driven via the cylinders 410 (410'), 420 (420'), and 430 (430'), and/or additional valves, flow paths, and/or cylinders may be provided to enable control of other attachments. It should also be understood that the rotational directions herein (e.g., rotational directions 163, 164, 165, and 166) are given as examples, and other rotational directions may be driven via cylinders and/or valves in other embodiments.

This written description uses examples to describe the present embodiments, including the best mode, and also to enable any person skilled in the art to practice the presently disclosed embodiments, including making and using any devices or systems and performing any incorporated methods. The patentable scope of the presently disclosed embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A skid-steer loader system, comprising:
   a skid-steer loader comprising a frame;
   an attachment assembly configured to couple to the skid-steer loader;
   a hydraulic system, comprising:
      a first hydraulic cylinder configured to drive rotation of the attachment assembly relative to the frame of the skid-steer loader in a first rotational direction;
      a valve assembly configured to adjust a flow of fluid to the first hydraulic cylinder, wherein the valve assembly comprises a first control valve and a second control valve; and
   a controller configured to receive an operator input from an input device and to control the valve assembly to a first configuration to provide the flow of fluid to the first hydraulic cylinder to drive the rotation of the attachment assembly relative to the frame of the skid-steer loader in the first rotational direction based on the operator input;
   wherein the controller is configured to receive an additional input indicative of whether the attachment assembly is coupled to the skid-steer loader, to control the first control valve to enable the flow of fluid to the second control valve in response to the additional input indicating that the attachment assembly is coupled to the skid-steer loader, and to control the second control valve to provide the flow of fluid to the first hydraulic cylinder based on the operator input.

2. The skid-steer loader system of claim 1, wherein the first hydraulic cylinder is a first tilt cylinder that is configured to drive the rotation of the attachment assembly relative to the frame in the first rotational direction about a lateral axis of the skid-steer loader.

3. The skid-steer loader system of claim 1, wherein the attachment assembly comprises a loader assembly comprising a loader bucket.

4. The skid-steer loader system of claim 1, further comprising the input device, wherein the input device comprises a joystick, a handgrip, or a lever positioned within the skid-steer loader.

5. The skid-steer loader system of claim 1, further comprising:
   an additional attachment assembly configured to couple to the skid-steer loader;
   wherein the hydraulic system further comprises a second hydraulic cylinder configured to drive rotation of the additional attachment assembly relative to the frame of the skid-steer loader in a second rotational direction, and the valve assembly is configured to adjust the flow of fluid to the second hydraulic cylinder;
   wherein the controller is configured to control the valve assembly to a second configuration to provide the flow of fluid to the second hydraulic cylinder to drive the rotation of the additional attachment assembly relative to the frame of the skid-steer loader in the second rotational direction based on the operator input.

6. The skid-steer loader system of claim 5, wherein the valve assembly comprises a third control valve, the additional input is indicative of whether the attachment assembly or the additional attachment assembly is coupled to the skid-steer loader, the controller is configured to control the first control valve to enable the flow of fluid to the third control valve in response to the additional input indicating that the additional attachment assembly is coupled to the skid-steer loader, and the controller is configured to control the third control valve to provide the flow of fluid to the second hydraulic cylinder based on operator input.

7. The skid-steer loader system of claim 5, wherein the additional attachment assembly comprises a dozer assembly comprising a dozer blade.

8. The skid-steer loader system of claim 1, wherein the hydraulic system comprises a second hydraulic cylinder configured to drive rotation of the attachment assembly relative to the frame of the skid-steer loader in the first rotational direction, the valve assembly is configured to adjust the flow of fluid to the second hydraulic cylinder, and the controller is configured to control the valve assembly to the first configuration to provide the flow of fluid to the second hydraulic cylinder to drive the rotation of the attachment assembly relative to the frame of the skid-steer loader in the first rotational direction based on the operator input.

9. The skid-steer loader system of claim 8, wherein the second hydraulic cylinder is a second tilt cylinder that is configured to drive the rotation of the attachment assembly relative to the frame in the first rotational direction about the lateral axis of the skid-steer loader.

10. A dual mode control system for a skid-steer loader, comprising:
    a hydraulic system configured to drive a first attachment assembly while the first attachment assembly is coupled to the skid-steer loader and a second attachment assembly while the second attachment assembly is coupled to the skid-steer loader, the hydraulic system comprising:
       a first hydraulic cylinder configured to drive rotation of the first attachment assembly in a first rotational direction relative to a frame of the skid-steer loader;
       a second hydraulic cylinder configured to drive rotation of the second attachment assembly in a second rotational direction relative to the frame of the skid-steer loader;

a valve assembly configured to adjust a flow of fluid to the first hydraulic cylinder and the second hydraulic cylinder; and a controller configured to:
receive an input indicative of whether the first attachment assembly or the second attachment assembly is coupled to the skid-steer loader;
control the valve assembly to a first configuration to enable the flow of fluid to the first hydraulic cylinder in response to the input indicating that the first attachment assembly is coupled to the skid-steer loader; and
control the valve assembly to a second configuration to enable the flow of fluid to the second hydraulic cylinder in response to the input indicating that the second attachment assembly is coupled to the skid-steer loader.

11. The dual mode control system of claim 10, wherein the first hydraulic cylinder is a tilt cylinder that is configured to drive the rotation of the first attachment assembly relative to the frame in the first rotational direction about a lateral axis of the skid-steer loader.

12. The dual mode control system of claim 11, wherein the second hydraulic cylinder is a tip cylinder that is configured to drive the rotation of the second attachment assembly relative to the frame in the second rotational direction about a longitudinal axis of the skid-steer loader.

13. The dual mode control system of claim 10, wherein the first attachment assembly comprises a loader assembly comprising a loader bucket, and the second attachment assembly comprises a dozer assembly comprising a dozer blade.

14. The dual mode control system of claim 10, wherein the input is provided to the controller via a sensor upon connection of one of the first attachment assembly or the second attachment assembly to the skid-steer loader.

15. The dual mode control system of claim 10, wherein the controller is configured to receive an operator input via an input device of the skid-steer loader, to control the valve assembly to enable the flow of fluid to the first hydraulic cylinder in response to a movement of the input device while the input indicates that the first attachment assembly is coupled to the skid-steer loader, and to control the valve assembly to enable the flow of fluid to the second hydraulic cylinder in response to the movement of the input device while the input indicates that the second attachment assembly is coupled to the skid-steer loader.

16. The dual mode control system of claim 15, further comprising the input device, wherein the input device comprises a comprises a joystick, a handgrip, or a lever positioned within the skid-steer loader.

17. A method for operating a skid-steer loader system having a dual mode control system, the method comprising:
receiving, at one or more processors, an input indicative of the skid-steer loader system being in a loader operating mode;
receiving, at the one or more processors, an operator input via an input device, wherein the operator input is indicative of a desired movement of a loader attachment assembly that is coupled to a skid-steer of the skid-steer loader system; and
controlling, using the one or more processors, a valve assembly to provide a flow of fluid to a first hydraulic cylinder to drive rotation of the loader attachment assembly relative to a frame of the skid-steer loader in a first rotational direction based on the operator input to achieve the desired movement of the loader attachment assembly;
wherein controlling the valve assembly to provide the flow of fluid to the first hydraulic cylinder comprises:
controlling, using the one or more processors, a first control valve of the valve assembly to enable the flow of fluid toward a second control valve of the valve assembly in response to the input indicative of the skid-steer loader system being in the loader operating mode; and
controlling, using the one or more processors, the second control valve to provide the flow of fluid to the first hydraulic cylinder based on the operator input to achieve the desired movement of the loader attachment assembly.

18. The method of claim 17, further comprising:
receiving, at the one or more processors, an additional input indicative of the skid-steer loader system being in a dozer operating mode;
receiving, at the one or more processors, the operator input via the input device, wherein the operator input is indicative of a respective desired movement of a dozer attachment assembly that is coupled to the skid-steer of the skid-steer loader system; and
controlling, using the one or more processors, the valve assembly to provide the flow of fluid to a second hydraulic cylinder to drive rotation of the dozer attachment assembly relative to the frame of the skid-steer loader in a second rotational direction based on the operator input to achieve the respective desired movement of the dozer attachment assembly.

19. The method of claim 18, wherein controlling the valve assembly to provide the flow of fluid to the second hydraulic cylinder comprises:
controlling, using the one or more processors, the first control valve of the valve assembly to enable the flow of fluid toward a third control valve of the valve assembly in response to the additional input indicative of the skid-steer loader system being in the dozer operating mode; and
controlling, using the one or more processors, the third control valve to provide the flow of fluid to the second hydraulic cylinder based on the operator input to achieve the respective desired movement of the dozer attachment assembly.

20. The method of claim 17, further comprising receiving the input from a sensor of the skid-steer loader system.

* * * * *